United States Patent
Romesberg et al.

[11] Patent Number: 5,942,321
[45] Date of Patent: Aug. 24, 1999

[54] HEADLINER

[75] Inventors: Floyd E. Romesberg, Saint Louisville; J. Daniel Asbury, Celina, both of Ohio; William J. Young, Bloomfield Hills, Mich.

[73] Assignee: Findlay Industries, Inc., Findlay, Ohio

[21] Appl. No.: 08/939,800

[22] Filed: Sep. 29, 1997

Related U.S. Application Data

[60] Provisional application No. 60/027,395, Sep. 30, 1996.

[51] Int. Cl.⁶ .................. B32B 3/26; B32B 5/26; B32B 31/08; B32B 31/20
[52] U.S. Cl. ............... 428/300.7; 156/221; 156/250; 156/269; 156/276; 264/45.1; 264/257; 264/321; 428/306.6; 428/317.1; 428/318.4; 442/224; 442/373
[58] Field of Search .................. 428/300.7, 306.6, 428/317.1, 318.4; 156/221, 250, 269, 276; 264/45.1, 257, 321; 442/224, 373

[56] References Cited

U.S. PATENT DOCUMENTS

| | | | |
|---|---|---|---|
| 3,816,234 | 6/1974 | Winfield | 161/160 |
| 4,073,535 | 2/1978 | Alfter et al. | 296/137 A |
| 4,263,247 | 4/1981 | Berger et al. | 264/273 |
| 5,037,690 | 8/1991 | Van Der Kooy | 428/116 |
| 5,486,256 | 11/1995 | Romesburg et al. | |

*Primary Examiner*—Blaine Copenheaver
*Attorney, Agent, or Firm*—Kremblas, Foster, Millard & Pollick

[57] ABSTRACT

A headliner is a laminate of multiple layers. The layers include polyurethane foam, agricultural fibers, a decorative material, and a backing. The agricultural fiber is jute, sisal, or kenaf or mixtures thereof. The method of making the headliner laminate includes making the sheet of agricultural fibers incorporating a binder, saturating a foam layer with an adhesive, putting one sheet of agricultural fibers on each side of the foam layer, applying the decorative material and backing to one side each, and squeezing the layers together to distribute the adhesive to all the layers and laminate them.

20 Claims, 1 Drawing Sheet

HEADLINER

This application claims the benefits of U.S. Provisional Application No. 60/027,395 filed Sep. 30, 1996.

FIELD OF THE INVENTION

This invention relates to a laminated panel and one use contemplated for the panel is as a headliner in the passenger compartment of trucks and passenger vehicles.

BACKGROUND OF THE INVENTION

Headliners for vehicles are conventionally constructed of fiber glass or multi-layered laminated panels incorporating fiber glass and foam resin layers. In the conventional manufacturing process, the layers are placed between mirror image mold surfaces, compressed, heated to cure an incorporated thermosetting resin, and then cut to shape at their periphery. Sometimes apertures for window openings, light fixtures, sun visors and the like are cut in the panels after molding. More often than not, in the assembly of the vehicle the headliner is inserted through the front window before the windshield is mounted. The typical headliner is in the shape of a dome with the concave surface facing downward. It is sufficiently rigid to hold its shape when mounted in the passenger compartment and supported along its side edges with the central part of the headliner juxtaposed to the roof.

Various problems exist in the assembly of the headliner and one of those problems is that the headliner includes a decorative layer as the exposed surface visible to the passengers. Any folds, creases or blemishes in the visible surface creates a problem for one marketing the vehicle. As a practical matter, it is unacceptable to have exposed blemishes. Also, breakage is a problem due to brittleness of the cured structure.

The headliner serves three other functions in addition to aesthetics which may be at odds with the concern for exposed blemishes. One function is to provide a soft surface to minimize injury with head bumps. Fiber glass headliners are hard as are conventional headliners incorporating foamed resin and do not provide much padding for one's head. The only cushioning is in the decorative fabric which may or may not have a soft foam backing. A second function is to provide insulation from heat between the roof of the vehicle and the interior or passenger compartment. The third function is to provide sound insulation from exterior wind noise, engine noise, and the like.

A common solution to the problem of heat and noise insulation is to use foamed resin layers in the headliner. The foamed resin is a better heat and sound barrier than resin impregnated fiber glass. Unfortunately, the foamed resin most often used is of the "closed cell" variety which includes a plurality of bubbles throughout the resin. Such foamed resin is initially quite rigid and with a sealed skin coating it is even more rigid. Therefore, when the headliner must be bent or folded out of its original molded shape to get it into the proper position for installation in the vehicle it often cracks and/or ruptures bubbles within the foamed layer itself. This often leaves a crease in the headliner which is visible through the fabric. That is also true of fiber glass headliners. Exposed creases are a problem because an exposed crease makes the flawed headliner unusable from a practical standpoint. As a consequence of the problem, the size of the windshield opening is often dictated by the size of the headliner which must be inserted (whether the vehicle manufacturer knows it or not). Making the windshield opening larger minimizes deflections of the headliner to get it in operative position.

The problem with fiber glass in headliners, wall panels, etc., is an environmental one. Glass fibers are not recyclable and when a waste or old product is discarded it is not biodegradable and cannot be burned.

Attention is directed to the patent to Romesberg, et al., U.S. Pat. No. 5,468,256. The inventor herein is a co-inventor in that patent and its disclosure is essentially set out in its claim one:

1. A process for making a flexible laminated sheet of foamed resin and fiber comprising,
    (a) providing layers of open celled polyurethane foam and non-woven scrim, said foam having a thickness in the ranges of about 0.1 to 1.1 inches, and ILD in the range of 10–80, a density in the range of 0.7–2 pounds per ft$^3$, and a permeability in the range 2–8 cfm,
    (b) providing a layer of material over said scrim layer,
    (c) chopping strands of fiber glass to a length in the range 1.5–3 inches and depositing by gravity a first layer of fiber glass over said layer of material, said fiber glass being applied in a density in the range 4–16 gm/ft$^2$, said layer of material between said first fiber glass layer and said scrim layer confining and supporting said first fiber glass layer.
    (d) impregnating said layer of foam with a liquid polyurethane resin, said liquid resin comprising a mixture of about 40–50 volume percent aromatic isocyanate, about 50–60 volume percent polyether polyol, and about 0.0–0.2 volume percent of a catalyst,
    (e) running said impregnated foam layer between a first pair of rollers to provide a uniform non-saturating dispersion of said liquid resin in said foam layer,
    (f) depositing a second layer of fiber glass over said foam layer, said second fiber glass layer having similar physical characteristics as said first fiber glass layer and being chopped and deposited on said foam layer in the same way as said first fiber glass layer is deposited on said layer of material,
    (g) applying said impregnated foam layer and second fiber glass layer over said first fiber glass layer with the foam layer sandwiched between said two fiber glass layers,
    (h) compressing all layers together between a pair of calendar rollers to form a laminate with said liquid resin being squeezed from said foam layer into the adjoining fiver glass layers,
    (i) applying a cover layer over said second layer of fiber glass, said cover layer being selected from the group consisting of a woven fabric, a permeable vinyl sheet, and an impermeable vinyl sheet,
    (j) placing said laminate and cover layer between a pair of molds for a period of about ½–3 min. and at a temperature in the range of about 230°–375° F. to form a preform to a desired shape, and
    (k) severing the peripheral edges of said preform to a desired configuration.

The use of fiber glass is a problem as indicated above.

SUMMARY OF THE INVENTION

The headliner of this invention substitutes a layer of agricultural fibers for the layers of fiber glass in the Romesberg et al. patent. Therein lies the difficulty.

The composite laminated structure to form the headliner or other useful panel requires a relatively uniform distribution of fibers laminated to the thick or central foamed resin layer. The problem is that glass is easily delivered in strands or bundles which may be severed or chopped easily to a uniform size. Glass fibers easily fall for easy distribution of uniform density on a conveyor belt or other impervious layer below. Glass fibers may be chopped to size easily and when they fall they do not agglomerate. That is the distinction from agricultural fibers.

When used in this specification the terms "agricultural fibers" is intended to mean jute, sisal, kenaf or their equivalent.

Distribution of the agricultural fibers in layers having a weight of about 7 grams/ft$^2$ both above and below a central polyurethane foam layer comprises the greater thickness of the panel being formed is the preferred layering sequence.

To the extent necessary for an understanding of this invention, the patent to Romesberg et al. U.S. Pat. No. 5,468,256 is incorporated herein by reference.

Objects of the invention not understood from the above will be fully appreciated upon a review of the appended drawings and the description of the preferred embodiment which follow.

BRIEF DESCRIPTION OF THE DRAWINGS

FIG. 2 is a schematic representation of the formation of a laminated panel according to this invention before it is formed into a headliner, door panel or the like.

DESCRIPTION OF THE PREFERRED EMBODIMENTS

Figure 1:
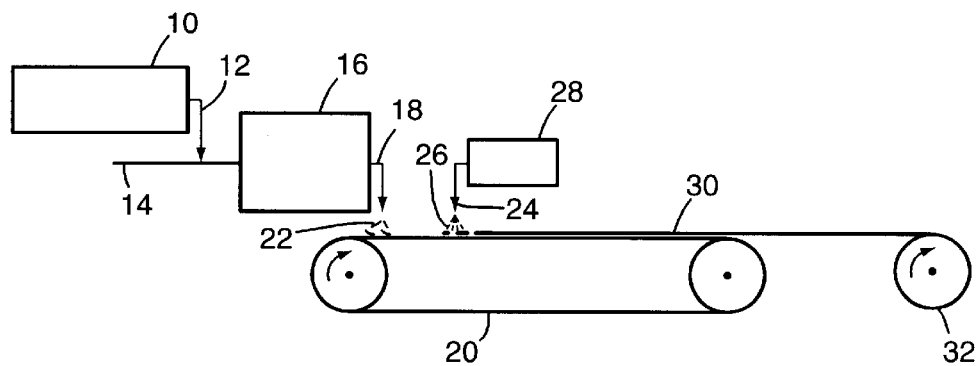
FIG. 1 is a schematic illustration of the formation of a sheet of agricultural fibers wound and stored on a roll for subsequent use.

Looking to FIG. 1, a supply of natural agricultural fiber 10 is cut to length and distributed at 12 to a vibrator 14.

Prior to delivering fibers through feed line 12, the fibers are chopped to a suitable size. In the preferred embodiment herein the fibers are chopped to have a length between 1 and 4 inches and more preferably between 1½ and 3 inches.

The vibrator 14 is to keep the mat of fibers in a somewhat fluid state as it progresses to a separator or fiber opener 16. Separator 16 is shown as a block and there may be various ways for keeping the agricultural fibers from agglomerating prior to their distribution on a conveyor belt which will be explained subsequently. Ways of separating fibers so they may be delivered with some sort of uniform delivery system across a cross-sectional area are known. Some include toothed rotating drums to fling the fibers in all directions inside a housing and keep it supported on an air bed or the like. There are undoubtedly dozens of others ways of doing this and one would certainly be an ionization process which might be incorporated to cause the various fibers to have a repelling charge distributed thereon. In any case, the separated fibers are discharged by a material handling fan, nozzle or other suitable structure at 18 onto a moving conveyor belt 20. The fibers 22 are required to be delivered onto the conveyor belt to have a distribution of less than 25 grams per square foot, preferably about 5–8 grams of fibers per square foot of surface area and most preferably about 7–7½ grams/ft$^2$. Preferably the conveyor belt 20 is about 72 inches wide. Clearly the fibers 22 may be distributed manually if necessary.

Immediately down stream of the discharge outlet 18 is a nozzle 24 which sprays an adhesive 26 from a storage container 28. Preferably the adhesive is a latex adhesive similar to ELMER'S® glue purchased from Evan's Adhesives in Columbus, Ohio, Adhesive No. 8186.

As the conveyor belt 20 progresses beyond the adhesive nozzle 24, the adhesive cures to freeze the fibers in place such that a thin flexible sheet 30 is formed and rolled on roller 32 for further use. The portion of adhesive 26 in layer 30 is relatively small such that it holds the fibers 22 in relative position but the layer is porous for easy passage of air or liquids as discussed subsequently.

Figure 2:
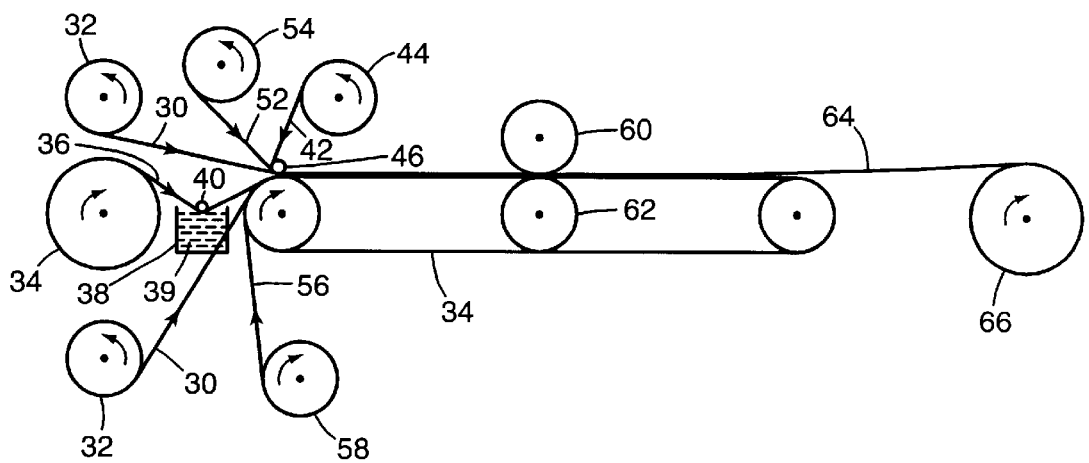

Looking now to FIG. 2, two rolls 32 of the sheets of fibers are mounted adjacent a second conveyor belt 34. It will be clear that the showing is a schematic illustration rather than a detailed dimensionally correct working engineering drawing.

Figure 3:
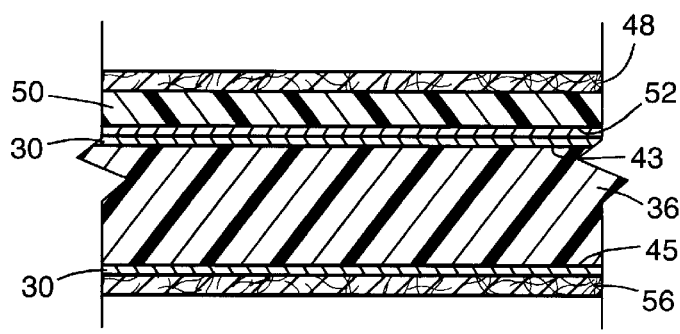
FIG. 3 is a fragmentary sectional view showing the laminated layers of the panel of this invention.

A roll 34 of a sheet 36 of polyurethane foam is drawn to a bath 38 of liquid polyurethane adhesive 39 and subsequently is directed to the conveyor belt 34 to be sandwiched between the two layers of fiber sheet 30, one sheet of agricultural fiber 30 being on one side 43 of said foam layer 36 and one sheet of agricultural fiber 30 being on the other side 45 of said foam layer 36, see FIG. 3.

By way of illustration only, a small roller 40 forces the foam layer 36 into the urethane resin 39 to partially saturate the same and its purpose will be explained subsequently.

A layer of decorative fabric 42 is drawn from roll 44 and is directed to the conveyor belt 34 in over lying condition above one of the layers of fiber sheet 30 and foam layer 36 by a small roller or guide 46.

The roll of decorative material 44 is supplied as a composite of a fabric 48 suitable for an exposed surface of the headliner inside the passenger compartment of a vehicle. Fabric 48 is flame bonded or laminated to a thin polyurethane foam resin layer 50. Note that this disclosed layering sequence is illustrated in FIG. 3, but the flame lamination of the foam layer 50 to the decorative fabric 48 is done elsewhere and the roll 44 supplied as a laminated source material as a composite unit.

A sheet of adhesive 52 is supplied from a roll 54 and is delivered to conveyor belt 34 by guide 46 such that the adhesive sheet 52 is located between the saturated polyurethane foam layer 36 and thin foam resin layer 50.

Adhesive sheet 52 may be ethylene acrylic acid copolymer sold under the trade designation of Dow Chemical Company as Dow 899 or a laminated structure designated Dow 906 which comprises an impermeable polyethylene sheet having layers of the aforesaid copolymer at each surface. The impermeable polyethylene layer may be used where it is desirable that a liquid impermeable barrier be established between the decorative fabric 48 and the liquid impregnated foam layer 36. Note that sheet 30 is not impermeable.

The bottom layer as illustrated in FIG. 2 is preferably a polyester fibrous backing 56 supplied from a roll 58 and it may serve as a good bonding surface for VELCRO patches or the like to hold a molded headliner in place inside the passenger compartment of a vehicle.

After the layered structure is oriented on conveyor belt 34 it is directed between a rubber roller 60 and a steel roller 62. Rollers 60 and 62 squeeze the composite so that the liquid polyurethane resin impregnating layer 36 is squeezed into contact with the agricultural fiber layers 30 to bond all of the layers together. The porous structure of layers 30 allows the liquid polyurethane 39 to penetrate to juxtaposed layers 52 and 56.

As indicated earlier where there is some concern that the liquid resin in layer 36 may propagate to the surface of fabric layer 48 and create unsightly stains, the layered adhesive sheet 52 comprised of the Dow 906 product is used.

After departing from the pinch rollers 60, 62 the conveyor belt 34 delivers the laminated sheet 64 to a roll 66 where it is stored for subsequent use if desired. It may be that the composite layer 64 will be delivered directly to the molding system and severed to shape immediately after leaving the conveyor belt 34. The system for forming the laminate of FIG. 3 into the desired shape is described in the aforementioned Romesberg, et al. patent and need not be repeated here.

The thermosetting adhesive resin mixture 39 applied at 40 is about 36–50% polyether polyol by weight, preferably in the range of about 40–60% by volume, about 50–64% aromatic isocyanate by volume with an appropriate catalyst if desired of about 0.0–0.2% by volume. Preferably the volume of isocyanate is in the range from about 52–63%. The resin mixture 39 should have a ratio of isocyanate equivalents to polyol equivalents index above about 1–1.65.

Preferred polyols comprise a hydroxyl terminated poly (oxyalkylene) polyol, most preferably a hydroxyl terminated poly (oxyethylene) polyol of appropriate molecular weight and functionality, such as obtainable from Dow Chemical as VORANOL 446. A small amount of (up to about 6%) VORANOL 800 (trademark of Dow Chemical Co.) may be used effectively. Such polyether polyols may be used in the adhesive mixture 39 to achieve the desired hardness and flexibility in the cured resin.

The preferred isocyanate is a polymethylenepolypheylene ester of isocyanate acid, such as obtainable from Mobay Corporation under the trade designation MONDUR MR or Dow Chemical designation Dow Pappi 2027, whose composition consists essentially of about 45–55% of diphenylmethane diisocyanate (MDI), about 45–55% of higher oligomers of MDI, and a trace of phenyl isocyanate.

Suitable catalysts are available from Air Products and Chemicals, Inc. under the trade designation DABCO T-12 (a specially formulated high-boiling liquid dibutyltin dilaurate) or the like. The proportions of catalyst needed may vary, depending upon curing temperature, relative humidity of the air (normally in the range 35–80%) and other factors known in the industry. By way of preferred example, in the above stated environmental conditions, about 0.11 parts per 100 parts polyol. Preferably the catalysts are added to the polyol prior to its mixture with the isocyanate. With adequate increased portions of the VORANOL 800 resin, the catalyst may be eliminated entirely.

While the preferred embodiment is described with a particular polyol, isocyanate and catalyst, it will be clear that the time periods and the temperatures for curing could be modified by adjustment of the catalyst and other parameters and these would be obvious modifications well within the inventive concept. Similarly, the curing time might be reduced for the liquid resin adhesive by a controlled increase in the humidity in the vicinity of the mold.

The preferred foam for foam layer 36 is sold under the trade designation Carpenter L51Y (density 1.2, 65 ILD). A useful foam is Burkart 12024 (density 1.2, 24 ILD). Preferably foam layer 36 has a thickness of about 0.1–1.1 inches and most preferably a thickness of about ¼ inch. The density has an operable range of about 0.7–2 pounds per cubic foot; the foam should have an ILD in the range 10–80; and a permeability based on Dow Chemical Flow Meter in the range 2–8 cfm, preferably 4–6 cfm. Where this foam is used with the prior art isocyanate resin and amine catalyst the cured resin makes the foam layer too crumbly or brittle for effective use; blemishes at the decorative surface are too evident. On the other hand, where the polyurethane liquid resins (VORANOL 446 and 800) are used, the cured resin and foam combination is sufficiently rigid for parts like headliners yet flexible enough to bend without breaking. The combined flexibility and rigidity is critical in the installation process.

The theory of operation for the headliner is that the two layers of agriculture fiber 30 act as the outside flanges of an I-beam and the foam layer 36 is the bridge between the flanges. The combination of the foam and cured polyurethane resin achieves a desired compression modulus to allow the fiber layers to perform their I-beam functions. Should the bending forces on the headliner overcome the compression modulus, the cured polyurethane is sufficiently flexible as to allow the foam to partially collapse. The agricultural fiber layers 30 remain the same length and the crinkling of inner layer 30 is allowed because of the properties of foam core 36. This allows a resilient flexing of all the layers without a cracking or breaking of the laminate. Thus, there is no blemish to propagate to the decorative surface. To facilitate a uniform controlled crimp or crinkle pattern where a fold is expected, surface grooves may be formed in the laminate by the molds. Thereby, when the molding step takes place as illustrated in the Romesberg, et al. patent a turkeyfoot pattern is predictable as to pattern and location.

One significant advantage of substituting liquid polyurethane 39 for isocyanate is the reduction of curing temperature. Isocyanate cures at about 375° F. At that high temperature it is not possible to use a vinyl decorative layer in the single molding step of this invention. Vinyl deteriorates at 375° F. The liquid polyurethane of this invention cures at about 250° F.

Having thus described the invention in its preferred embodiment, it will be clear that other modifications may be made without departing from the spirit of the invention. Also the language used to describe the inventive concept and the drawings accompanying the application to illustrate the same are not intended to be limiting on the invention. Rather it is intended that the invention be limited only by the scope of the appended claims.

We claim:

1. A headliner formed from laminated layers of polyurethane foam, agricultural fibers, a decorative material and a backing, wherein a layer of agricultural fiber is secured on each side of said foam, said layer of agricultural fiber being a sheet having a weight less than 25 grams per square foot and including an adhesive, each layer of agricultural fiber being bonded to said foam by a liquid adhesive partially saturating said foam and in contact with said sheet of agricultural fiber;

said decorative material is attached to one of said sheets of agricultural fiber by an adhesive sheet; and said backing is attached to the other of said sheets of agricultural fiber.

2. The headliner according to claim 1, wherein said agricultural fiber is selected from the group consisting of jute, sisal, kenaf and mixtures thereof.

3. The headliner according to claim 2, wherein said agricultural fiber has a weight between about 7 grams per square foot and about 7½ grams per square foot.

4. The headliner according to claim 1, wherein said agricultural fiber has a weight between about 5 grams per square foot and about 8 grams per square foot.

5. The headliner according to claim 1, wherein said adhesive in said sheet of agricultural fiber is a latex adhesive.

6. The headliner according to claim 1, wherein said agricultural fibers are chopped to have a length between about 1 and about 4 inches.

7. The headliner according to claim 6, wherein said agricultural fibers are chopped to have a length between about 1½ inches and about 3 inches.

8. The headliner according to claim 1, wherein said decorative material comprises a fabric attached to a foam resin.

9. The headliner according to claim 1, wherein said adhesive sheet comprises an ethylene acrylic acid copolymer.

10. The headliner according to claim 1, wherein said liquid adhesive is a thermosetting adhesive.

11. A method of making a headliner, comprising:
   forming sheets of agricultural fiber, comprising:
      providing an agricultural fiber;
      chopping said agricultural fiber to provide individual fibers of specified length;
      distributing said agricultural fiber on a surface;
      applying an adhesive to said agricultural fiber; and
      curing said applied adhesive and said agricultural fiber to from a sheet having a weight less than 25 grams per square foot;
   providing a foam layer;
   partially saturating said foam layer with a liquid adhesive;
   placing one of said sheets of agricultural fiber on each side of the foam layer;
   placing a decorative material on one of said sheets of agricultural fiber;
   placing a backing on the other of said sheets of agricultural fiber; and
   squeezing together said foam layer, said sheets of agricultural fiber, said decorative material, and said backing to form a laminated sheet.

12. The method of making a headliner according to claim 11, wherein said partially saturating step comprises drawing said foam layer into a bath of said liquid adhesive prior to placing said foam layer between said sheets.

13. The method of making a headliner according to claim 12, wherein said distribution step includes the step of vibrating said fibers to maintain a uniform distribution of said fibers.

14. The method of making a headliner according to claim 11, wherein said distribution step includes the step of separating said fibers to minimize agglomeration.

15. The method of making a headliner according to claim 11, wherein said distribution step includes the step of vibrating said fibers to maintain a uniform distribution of said fibers.

16. The method of making a headliner according to claim 11, wherein said step of applying an adhesive to said agricultural fibers comprises spraying an adhesive on said agricultural fibers.

17. The method of making a headliner according to claim 11, wherein said step of placing a decorative material on one of said sheets of agricultural fiber includes the steps of providing a fabric and a foam resin layer and joining said fabric and said foam resin layer.

18. The method of making a headliner according to claim 11, further comprising the step of placing an adhesive sheet between said one of said sheets of agricultural fiber and said decorative material.

19. The method of making a headliner according to claim 11, further comprising the steps of molding said laminated sheet.

20. The method of making a headliner according to claim 19, further comprising the step of severing said laminated sheet to shape.

* * * * *